(12) United States Patent
Brush et al.

(10) Patent No.: US 8,731,936 B2
(45) Date of Patent: May 20, 2014

(54) ENERGY-EFFICIENT UNOBTRUSIVE IDENTIFICATION OF A SPEAKER

(75) Inventors: Alice Jane B. Brush, Bellevue, WA (US); Nissanka Arachchige Bodhi Priyantha, Redmond, WA (US); Jie Liu, Medina, WA (US); Amy K. Karlson, Bellevue, WA (US); Hong Lu, Lebanon, NH (US)

(73) Assignee: Microsoft Corporation, Redmond, WA (US)

( * ) Notice: Subject to any disclaimer, the term of this patent is extended or adjusted under 35 U.S.C. 154(b) by 545 days.

(21) Appl. No.: 13/116,017

(22) Filed: May 26, 2011

(65) Prior Publication Data

US 2012/0303369 A1    Nov. 29, 2012

(51) Int. Cl.
*G10L 11/02* (2006.01)

(52) U.S. Cl.
USPC .......................................... 704/270; 455/574

(58) Field of Classification Search
USPC .................. 704/270, 246–250, 273, 200–230
See application file for complete search history.

(56) References Cited

U.S. PATENT DOCUMENTS

| | | | |
|---|---|---|---|
| 6,112,176 A | 8/2000 | Goldenthal et al. | |
| 6,847,892 B2 | 1/2005 | Zhou et al. | |
| 7,016,833 B2 * | 3/2006 | Gable et al. | 704/209 |
| 7,069,221 B2 * | 6/2006 | Crane et al. | 704/275 |
| 7,133,372 B2 * | 11/2006 | Glendining et al. | 370/311 |
| 7,180,892 B1 * | 2/2007 | Tackin | 370/389 |
| 7,408,506 B2 | 8/2008 | Miller | |
| 7,437,286 B2 * | 10/2008 | Pi et al. | 704/233 |
| 7,783,022 B1 | 8/2010 | Jay et al. | |
| 8,452,597 B2 * | 5/2013 | Bringert et al. | 704/251 |
| 2004/0199384 A1 | 10/2004 | Hong | |
| 2007/0218938 A1 | 9/2007 | Carter | |
| 2008/0111698 A1 | 5/2008 | Atherton | |
| 2010/0074450 A1 | 3/2010 | Liao | |
| 2010/0291972 A1 | 11/2010 | Gandhi et al. | |
| 2010/0313050 A1 | 12/2010 | Harrat et al. | |
| 2011/0254792 A1 | 10/2011 | Waters et al. | |
| 2012/0100895 A1 | 4/2012 | Priyantha et al. | |

OTHER PUBLICATIONS

Zhenyun, et al., "Improving Energy Efficiency of Location Sensing on Smartphones," retrieved at <<http://acm.org>>, Proceedings of the 8th International Conference on Mobile Systems, Applications, and Services, Jun. 2010, pp. 315-329.

Abdelzaher, et al., "Mobiscopes for Human Spaces," retrieved at <<http://graphics.stanford.edu/projects/lgl/papers/aabbegkmr-mhs-pc07/aabbegkmr-mhs-pc07.pdf>>, IEEE Pervasive Computing, vol. 6, No. 2, Apr.-Jun. 2007, 10 pages.

(Continued)

*Primary Examiner* — Abul Azad
(74) *Attorney, Agent, or Firm* — Dan Choi; Carole Boelitz; Micky Minhas

(57) ABSTRACT

Functionality is described herein for recognizing speakers in an energy-efficient manner. The functionality employs a heterogeneous architecture that comprises at least a first processing unit and a second processing unit. The first processing unit handles a first set of audio processing tasks (associated with the detection of speech) while the second processing unit handles a second set of audio processing tasks (associated with the identification of speakers), where the first set of tasks consumes less power than the second set of tasks. The functionality also provides unobtrusive techniques for collecting audio segments for training purposes. The functionality also encompasses new applications which may be invoked in response to the recognition of speakers.

14 Claims, 12 Drawing Sheets

(56) References Cited

OTHER PUBLICATIONS

Agrawal, et al., "Sonmiloquy: Augmenting Network Interfaces to Reduce PC Energy Usage," retrieved at <<http://research.microsoft.com/pubs/79419/agarwal-nsdi09-somniloquy.pdf>>, Proceedings of the 6th USENIX Symposium on Networked Systems Design and Implementation, 2009, 16 pages.

Barroso, et al., "The Case for Energy-Proportional Computing," retrieved at <<http://www.barroso.org/publications/ieee_computer07.pdf>>, IEEE Computer Society, vol. 40, No. 12, Dec. 2007, pp. 33-37.

Hoh, et al., "Virtual Trip Lines for Distributed Privacy-Preserving Traffic Monitoring," retrieved at <<http://acm.org>>, Proceedings of the 6th International Conference on Mobile Systems, Applications, and Services, Jun. 2008, pp. 15-28.

Burke, et al., "Participatory Sensing," retrieved at <<http://escholarshi.org/uc/item/19h777qd>>, WSW'06 at SenSys '06, Oct. 31, 2006, 5 pages.

Chiu, et al., "Playful Bottle: A Mobile Social Persuasion System to Motivate Healthy Water Intake," retrieved at <<http://acm.org>>, Proceedings of the 11th International Conference on Ubiquitous Computing, Sep. 30-Oct. 3, 2009, pp. 185-194.

Consolvo, et al., "Flowers or a Robot Army?: Encouraging Awareness & Activity with Personal, Mobile Displays," retrieved at <<http://acm.org>>, Proceedings of the 10th International Conference on Ubiquitous Computing, 2008, pp. 54-63.

Foster, et al., "Precision and accuracy of an ankle-worn accelerometer-based pedometer in step counting and energy expenditure," Preventive Medicine, vol. 41, No. 3-4, Sep.-Oct. 2005, pp. 778-783.

Hull, et al., "CarTel: A Distributed Mobile Sensor Computing System," retrieved at <<http://acm.org>>, Proceedings of the 4th International Conference on Embedded Networked Sensor Systems, Nov. 2006, pp. 125-138.

Lester, et al., "A Practical Approach to Recognizing Physical Activities," retrieved at <<http://www.cs.virginia.edu/~whitehouse/courses/cs651Fall06/lester06practicalApproachToRecognizingPhysicalActivities.pdf>>, Pervasive Computing, in LNCS, vol. 3968, Springer-Verlag Berlin Heidelberg, 2006, 16 pages.

Mohan, et al., "Nericell: Rich Monitoring of Road and Traffic Conditions using Mobile Smartphones," retrieved at <<http://acm.org>>, Proceedings of the 6th ACM Conference on Embedded Network Sensor Systems, Nov. 2008, pp. 323-336.

Oliver, et al., "Health Gear: A Real-Time Wearable System for Monitoring and Analyzing Physiological Signals," retrieved at <<http://citeseerx.ist.psu.edu/viewdoc/download?doi=10.1.1.136.4121&rep=rep1&type=pdf>>, Proceedings of the International Workshop on Wearable and Implantable Body Sensor Networks, 2006, 4 pages.

Pering, et al., "The PSI Board: Realizing a Phone-Centric Body Sensor Network," In 4th International Workshop on Wearable and Implantable Body Sensor Networks, 2007, 6 pages.

Riva, et al., "The Urbanet Revolution: Sensor Power to the People!," retrieved at <<http://cs.njit.edu/borcea/papers/ieee-pervasive07.pdf>>, IEEE Pervasive Computing, vol. 6, No. 2, Apr. 2007, pp. 41-49.

Woodman, et al., "Pedestrian Localisation for Indoor Environments," retrieved at <<http://acm.org>>, Proceedings of the 10th International Conference on Ubiquitous Computing, Sep. 2008, pp. 114-123.

Yu, et al., "Personalized Awareness and Safety with Mobile Phones as Sources and Sinks," retrieved at <<http://research.microsoft.com/pubs/102274/yu_urbansense08.pdf>>, Proceedings of Urbansense, Workshop Held in Conjunction with SenSys, Nov. 2008, pp. 26-30.

Lester, et al., "Validated Caloric Expenditure Estimation using a Single Body-Worn Sensor," retrieved at <<http://acm.org>>, Proceedings of the 11th International Conference on Ubiquitous Computing, Sep. 30-Oct. 3, 2009, pp. 225-234.

Lin, et al., "Energy-Accuracy Trade-Off for Continuous Mobile Device Location," retrieved at <<http://acm.org>>, Proceedings of the 8th International Conference on Mobile Systems, Applications, and Services, Jun. 2010, pp. 285-298.

Paek, et al., "Energy-Efficient Rate-Adaptive GPS-Based Positioning for Smartphones," retrieved at <<http//acm.org>>, Proceedings of the 8th International Conference on Mobile Systems, Applications, and Services, Jun. 2010, 299-314.

Vikki, et al., "Cepstral Domain Segmental Feature Vector Normalization for Noise Robust Speech Recognition," Speech Communication, vol. 25, 1998, pp. 133-147.

Kapur, Narinder, "Compensating for Memory Deficits with Memory Aids," in Memory Rehabilitation: Integrating Theory and Practice, Wilson, Barbara A. (ed.), The Guilford Press, New York, 2009, pp. 52-73.

Abdesslem, et al., "Less is More: Energy-Efficient Mobile Sensing with SenseLess," retrieved at <http://conferences.sigcomm.org/sigcomm/2009/workshops/mobiheld/papers/p61.pdf>, Proceedings of the 1st ACM Workshop on Networking, Systems, and Applications for Mobile Handhelds, 2009, pp. 61-62.

Kang, et al., "A Scalable and Energy-Efficient Context Monitoring Framework for Mobile Personal Sensor Networks," retrieved at <http://ieeexplore.ieee.org/xpl/freeabs_all.jsp?arnumber=5210114>, IEEE Transactions on Mobile Computing, vol. 9, No. 5, May 2010, pp. 686-702.

Shin, et al., "DEAMON: Energy-efficient sensor monitoring," retrieved at <http://www.ists.dartmouth.edu/library/429.pdf>>, Proceedings of the 6th Annual IEEE Communications Society Conference on Sensor, Mesh and Ad Hoc Communications and Networks, 2009, 9 pages.

Zhuang, et al., "Improving Energy Efficiency of Location Sensing on Smartphones," retrieved at <http://www.deutsche-telekom-laboratories.com/~kyuhan/papers/MobiSys10Kim.pdf>, Proceedings of the 8th International Conference on Mobile systems, Applications, and Services, 2010, pp. 315-330.

Sang, et al., "Speaker Recognition System in Multi-Channel Environment," retrieved at <<http://ieeexplore.ieee.org/stamp/stamp.jsp?tp=&arnumber=1244369>>, IEEE International Conference on Systems, Man and Cybernetics, Oct. 2003, pp. 3116-3121.

Glass, et al., "Telephone-based Conversational Speech Recognition in the Jupiter Domain," retrieved at <<http://people.csail.mit.edu/hazen/publications/ICSLP98.pdf>>, Proceedings of the International Conference on Spoken Language Processing, 1998, 4 pages.

Grassi, et al., "Distributed Speaker Recognition using the ETSI Aurora Standard," retrieved at <<http://193.226.6.174/COST276_3/pdf/paper21.pdf>>, Proceedings of the 3rd COST 276 Workshop on Information and Knowledge Management for Integrated Media Communication, Oct. 2002, pp. 120-125.

Rossi, et al., "Collaborative Real-Time Speaker Identification for Wearable Systems," retrieved at <<http://ieeexplore.ieee.org/stamp/stamp.jsp?tp=&arnumber=5466976>>, IEEE International Conference on Pervasive Computing and Communications (PerCom), Mar. 2010, pp. 180-189.

Murthy, et al., "Robust Text-Independent Speaker Identification over Telephone Channels," retrieved at <<http://ieeexplore.ieee.org/stamp/stamp.jsp?tp=&arnumber=784108>>, IEEE Transactions on Speech and Audio Processing, vol. 7, No. 5, Sep. 1999, pp. 554-568.

Hayes, et al., "The Personal Audio Loop: Designing a Ubiquitous Audio-based Memory Aid," retrieved at <<http://citeseerx.ist.psu.edu/viewdoc/download;jsessionid=FD39C22C806607F8E3B8DE6BCC8DEA69?doi=10.1.1.85.8019&rep=rep1&type=pdf>>, Proceedings of Mobile HCI, 2004, pp. 168-179.

Hodges, et al., "SenseCam: A Retrospective Memory Aid," retrieved at <<http://citeseerx.ist.psu.edu/viewdoc/download?doi=10.1.1.86.8534&rep=rep1&type=pdf>>, Proceedings 8th International Conference on Ubicomp, 2006, pp. 177-193.

Huang, et al., "A Novel Approach to Robust Speech Endpoint Detection in Car Environments," retrieved at <<http://ieeexplore.ieee.org/stamp/stamp.jsp?tp=&arnumber=862091>>, IEEE International Conference on Acoustics, Speech, and Signal Processing, vol. 3, 2000, pp. 1751-1754.

Lee, et al., "Lifelogging Memory Appliance for People with Episodic Memory Impairment," retrieved at <<http://www.cs.cmu.edu/~mllee/docs/UbiComp229-lee.pdf>>, Proceedings of the 10th International Conference on Ubiquitous Computing, 2008, 10 pages.

(56) References Cited

OTHER PUBLICATIONS

Lu, et al., "SoundSense: Scalable Sound Sensing for People-centric Applications on Mobile Phones," retrieved at <<http://citeseerx.ist.psu.edu/viewdoc/download?doi=10.1.1.151.3721&rep=rep1&type=pdf>>, Proceedings of the 7th International Conference on Mobile Systems, Applications, and Services, Jun. 2009, 14 pages.

Miluzzo, et al., "Darwin Phones: The Evolution of Sensing and Inference on Mobile Phones," retrieved at <<http://www.ists.dartmouth.edu/library/478.pdf>>, Proceedings of the 8th International Conference on Mobile Systems, Applications, and Services, Jun. 2010, pp. 5-20.

Miluzzo, et al., "Sensing Meets Mobile Social Networks: The Design, Implementation and Evaluation of the CenceMe Application," retrieved at <<http://citeseerx.ist.psu.edu/viewdoc/download?doi=10.1.1.147.3064&rep=rep1&type=pdf>>, Proceedings of the 6th ACM Conference on Embedded Network Sensor Systems, Nov. 2008, pp. 337-350.

"Power Monitor," retrieved at <<http://www.msoon.com/LabEquipment/PowerMonitor/>>, retrieved on Feb. 10, 2011, Monsoon Solutions, Inc., Bellevue, Washington, 1 page.

Priyantha, et al., "Little Rock: Enabling Energy Efficient Continuous Sensing on Mobile Phones," retrieved at <<http://research.microsoft.com/pubs/120316/LittleRock_TR.pdf>>, Microsoft Research, Technical Report No. MSR-TR-2010-14, 2010, 12 pages.

Rabiner, et al., "A Comparative Performance Study of Several Pitch Detection Algorithms," retrieved at <<http://ieeexplore.ieee.org/stamp/stamp.jsp?tp=&arnumber=1162846>>, IEEE Transactions on Acoustics, Speech and Signal Processing, vol. 24, No. 5, Oct. 1976, pp. 399-418.

Rachuri, et al., "EmotionSense: A Mobile Phone based Adaptive Platform for Experimental Social Psychology Research," retrieved at <<http://www.cs.st-andrews.ac.uk/~mirco/papers/ubicomp10.pdf>>, Proceedings of the 12th ACM International Conference on Ubiquitous Computing (UbiComp), Sep. 2010, 10 pages.

Reynolds, Douglas A., "An Overview of Automatic Speaker Recognition Technology," retrieved at <<http://citeseerx.ist.psu.edu/viewdoc/download?doi=10.1.1.86.3003&rep=rep1&type=pdf>>, Proceedings of the IEEE International Conference on Acoustics, Speech, and Signal Processing, 2002, pp. 4072-4075.

Reynolds, et al., "Robust Text-independent Speaker Identification using Gaussian Mixture Speaker Models," retrieved at <<http://ieeexplore.ieee.org/stamp/stamp.jsp?tp=&arnumber=365379>>, IEEE Transactions on Speech and Audio Processing, vol. 3, No. 1, Jan. 1995, pp. 72-83.

Saunders, John, "Real Time Discrimination of Broadcast Speech/Music," retrieved at <<http://ieeexplore.ieee.org/stamp/stamp.jsp?tp=&arnumber=543290>>, IEEE International Conference on Acoustics, Speech, and Signal Processing, May 1996, pp. 993-996.

Scheirer, et al., "Construction and Evaluation of a Robust Multifeature Speech/Music Discriminator," retrieved at <<http://www.ee.columbia.edu/~dpwe/papers/ScheiS97-mussp.pdf>>, IEEE International Conference on Acoustics, Speech, and Signal Processing, Apr. 1997, 4 pages.

Vemuri, et al., "iRemember: A Personal, Long-term Memory Prosthesis," retrieved at <<http://citeseerx.ist.psu.edu/viewdoc/download?doi=10.1.1.112.1643&rep=rep1&type=pdf>>, Proceedings of the 3rd ACM Workshop on Continuous Archival and Retrieval of Personal Experiences, Oct. 2006, 10 pages.

Wang, et al., "A Framework of Energy Efficient Mobile Sensing for Automatic user State Recognition," retrieved at <<http://www-scf.usc.edu/~wangyi/publications/tech_report_1.pdf>>, Proceedings of the 7th International Conference on Mobile Systems, Applications, and Services, Jun. 2009, 13 pages.

Zheng, et al., "Comparison of Different Implementations of MFCC," retrieved at <<http://citeseerx.ist.psu.edu/viewdoc/download?doi=10.1.1.90.6868&rep=rep1&type=pdf>>, Journal of Computer Science and Technology, vol. 6, No. 6, Sep. 2001, 17 pages.

\* cited by examiner

ENERGY-EFFICIENT UNOBTRUSIVE IDENTIFICATION OF A SPEAKER

BACKGROUND

Speaker recognition technology operates by generating a plurality of speaker models associated with respective users. For example, the speaker recognition technology can generate a plurality of Gaussian Mixture Models (GMMs) using the Expectation-Maximization (EM) technique. In a common training technique, the speaker recognition technology produces the speaker models from a training data set of representative audio segments; in one scenario, for example, each user is asked to provide an audio segment that characterizes his or her voice in a controlled environment with minimal noise. In a real-time phase of operation, the speaker recognition technology detects speech produced by a particular user in question. The speaker recognition technology matches the detected speech with one of the generated speaker models. The matching speaker model can then be mapped to the identity of the particular user.

While generally effective, known speaker recognition technology is not optimally suited for some environments and use scenarios.

SUMMARY

Functionality is described herein for identifying a speaker in an energy-efficient manner. In one case, the functionality employs a heterogeneous architecture that comprises at least a first processing unit and a second processing unit. The first processing unit handles a first set of audio processing tasks while the second processing unit handles a second set of audio processing tasks. The first set of audio processing tasks are performed more frequently than the second set of audio processing tasks; but the first set of audio processing tasks consumes less power than the second set of audio processing tasks. Hence, overall, the functionality conserves power by offloading the first set of audio processing tasks to the lower-power first processing unit.

In one case, the functionality can be implemented using a portable communication device of any type, such as a mobile telephone. The mobile telephone can employ the functionality to make efficient use of its limited power source.

According to another illustrative aspect, for the first set of audio processing tasks, the functionality first determines whether a received audio signal satisfies an audio strength test. Second, if audio signal satisfies the test, the functionality determines whether the audio signal contains human speech.

According to another illustrative aspect, for the second set of audio processing tasks, the functionality first identifies whether speech frames, obtained from the audio signal, have a quality which satisfies a prescribed admission test. These speech frames which satisfy the admission test are referred to as admitted frames herein. Second, the functionality associates a speaker model with the admitted frames with respect to an identified smoothing window. The speaker model corresponds to a particular user who is represented by the audio signal.

According to another illustrative aspect, the functionality comprises training functionality for generating speaker models in an unobtrusive manner. In one case, the training functionality obtains an audio segment that captures a telephone conversation between a local participant and a remote participant. The training functionality can then generate a speaker model for the local participant and a speaker model for the remote participant. The training functionality can apply one or more channel compensation techniques when generating the speaker model for the remote participant.

In another case, the training functionality obtains an audio segment that captures a one-on-one conversion between a first participant and a second participant. The training functionality can then apply a segmentation algorithm to distinguish between a part of the audio segment attributed to the first participant and a part of the audio segment attributed to the second participant. The training functionality can then generate a speaker model for the second participant based on the part of the audio segment that is attributed to the second participant.

In another case, each user can forward his or her speaker model to one or more other users. Henceforth, a recipient can use a user's speaker model to identify the user when speaking with the user.

According to another illustrative aspect, the functionality comprises one or more application modules for performing an action in response to the identification of a particular user. The action can comprise one or more: identifying a name of the particular user when the particular user speaks; associating life-logging data with the particular user; filtering social network data based on identification of the particular user; generating a reminder that is associated with the particular user; and so on.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
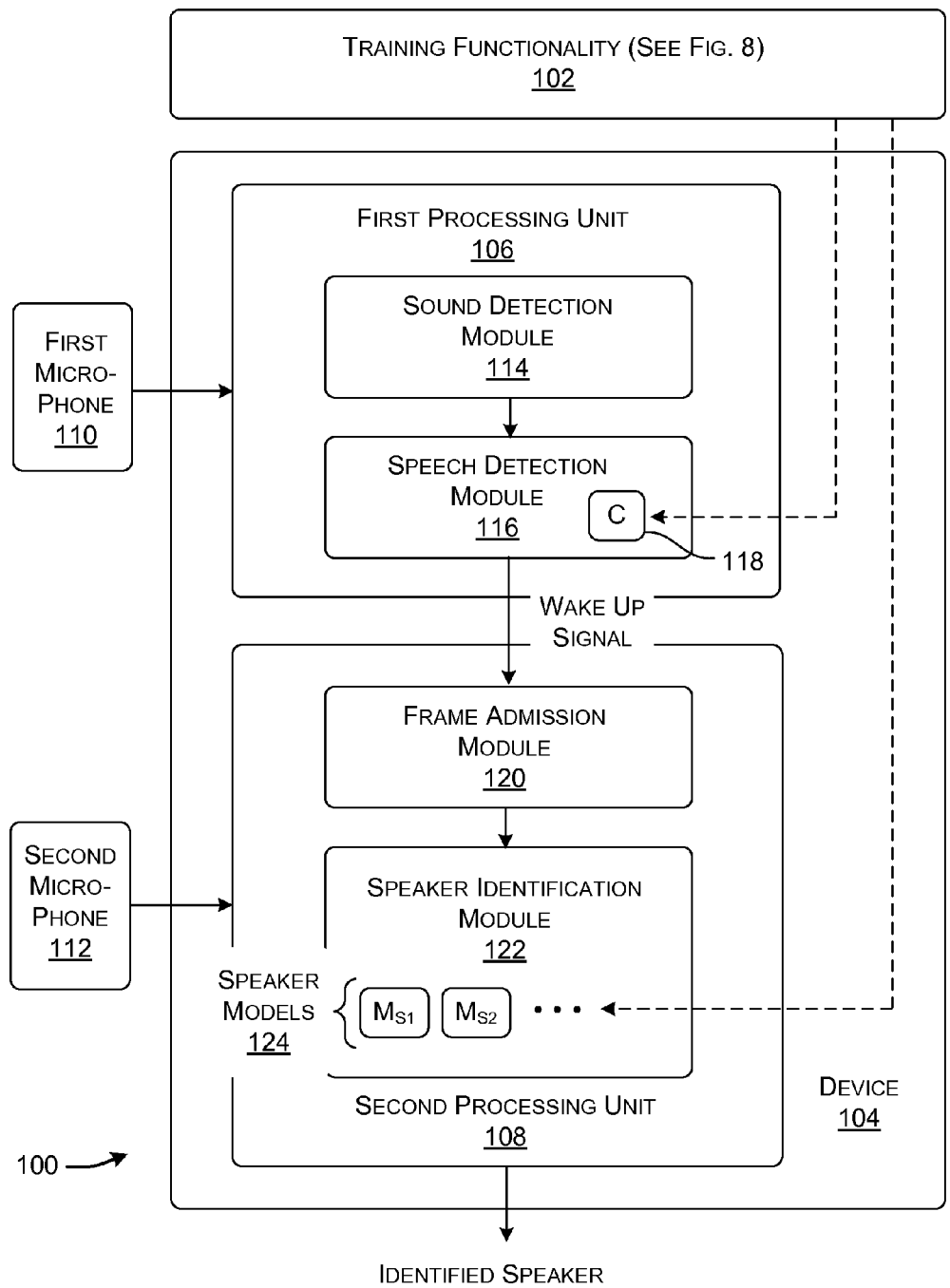
FIG. 1 shows a system for generating and applying speaker models.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an overview of a system for recognizing speakers in an energy-efficient manner. Section B provides additional details regarding different phases of operation of the system of Section A. Section C provides additional details regarding one manner of generating speaker models within the system of Section A. And Section D describes illustrative applications of the system of Section A.

As a preliminary matter, some of the figures describe concepts in the context of one or more structural components, variously referred to as functionality, modules, features, elements, etc. The various components shown in the figures can be implemented in any manner by any physical and tangible mechanisms (for instance, by software, hardware, firmware, etc., and/or any combination thereof). In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (for instance, by software, hardware, firmware, etc., and/or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Overview of the System

FIG. 1 shows a system 100 for recognizing speakers in an energy-efficient manner. From a high-level perspective, the system 100 includes training functionality 102 and at least one device 104. The training functionality 102 generates one or more speaker models in an unobtrusive manner. Section C provides additional details regarding the training functionality 102. The device 104 uses the models generated by the training functionality 102 to associate an audio signal with a particular speaker model, which, in effect, associates the audio signal with a particular speaker who is represented by the audio signal. One or more application modules (not shown in FIG. 1) can perform various application-specific actions in response to the detection of a speaker by the device 104. Section D provides additional details regarding representative application-specific actions that can be performed.

The device 104 may rely on a heterogeneous architecture that includes plural processing units having different respective characteristics. For example, FIG. 1 shows the use of at least a first processing unit 106 and a second processing unit 108. The first processing unit 106 handles a first set of audio processing tasks while the second processing unit 108 handles a second set of audio processing tasks. The first set of audio processing tasks are performed more frequently than the second set of speaker audio processing tasks, but consume less power than the second set of audio processing tasks cases. Hence, overall, the device 104 conserves power by offloading the first set of audio processing tasks to the first processing unit.

FIG. 1 shows that the first processing unit 106 receives an audio signal from a first microphone 110, while the second processing unit 108 receives an audio signal from a second microphone 112. In one case, the first microphone 110 is physically distinct from the second microphone 112. In another case, the first microphone 110 is the same as the second microphone 112.

The device 104 can allocate different respective functions to its heterogeneous resources in order to perform these functions in the most energy-efficient manner possible. For example, the first processing unit 106 can include respective modules for performing the first set of audio processing tasks, such as a sound detection module 114 and a speech detection module 116. The sound detection module 114 receives an audio signal from the first microphone 110. In response, the sound detection module 114 determines whether the audio signal satisfies an audio strength test. If so, the sound detection module 114 activates the speech detection module 116. The speech detection module 116, once activated, determines whether the audio signal contains human speech. The speech detection module 116 performs this task using a classification model 118 in the manner described below. (The training functionality 102 generates the classification model 118 in an offline manner and sends it to the device 104.) If human speech is detected, the speech detection module 116 activates the second processing unit 108.

The second processing unit 108 includes respective modules for performing the second set of audio processing tasks, such as a frame admission module 120 and a speaker identification module 122. Once activated, the frame admission module 120 receives an audio signal from the second microphone 112. The frame admission module 120 then identifies whether speech frames, obtained from the audio signal, have a quality which satisfy an admission test (to be described below). The speech frames which satisfy the admission test are referred to as admitted frames herein. If such admitted frames are detected, the frame admission module 120 activates the speaker identification module 122. The speaker identification module 122 matches a speaker model with the admitted frames. The speaker model corresponds to a particular user who is represented by the audio signal. The speaker identification module 122 performs this matching task by comparing the admitted frames against a collection of one or more speaker models 124 over a smoothing window (where the smoothing window comprises a series of admitted frames).

Although not illustrated in FIG. 1, the first processing unit 106 and the second processing unit 108 can perform other functions that are unrelated to the processing of audio signals for the purpose of speaker identification. For instance, the device 104 may represent a mobile telephone; in this case, the second processing unit 108 can also perform all of the applications hosted by the mobile telephone.

Figure 2:
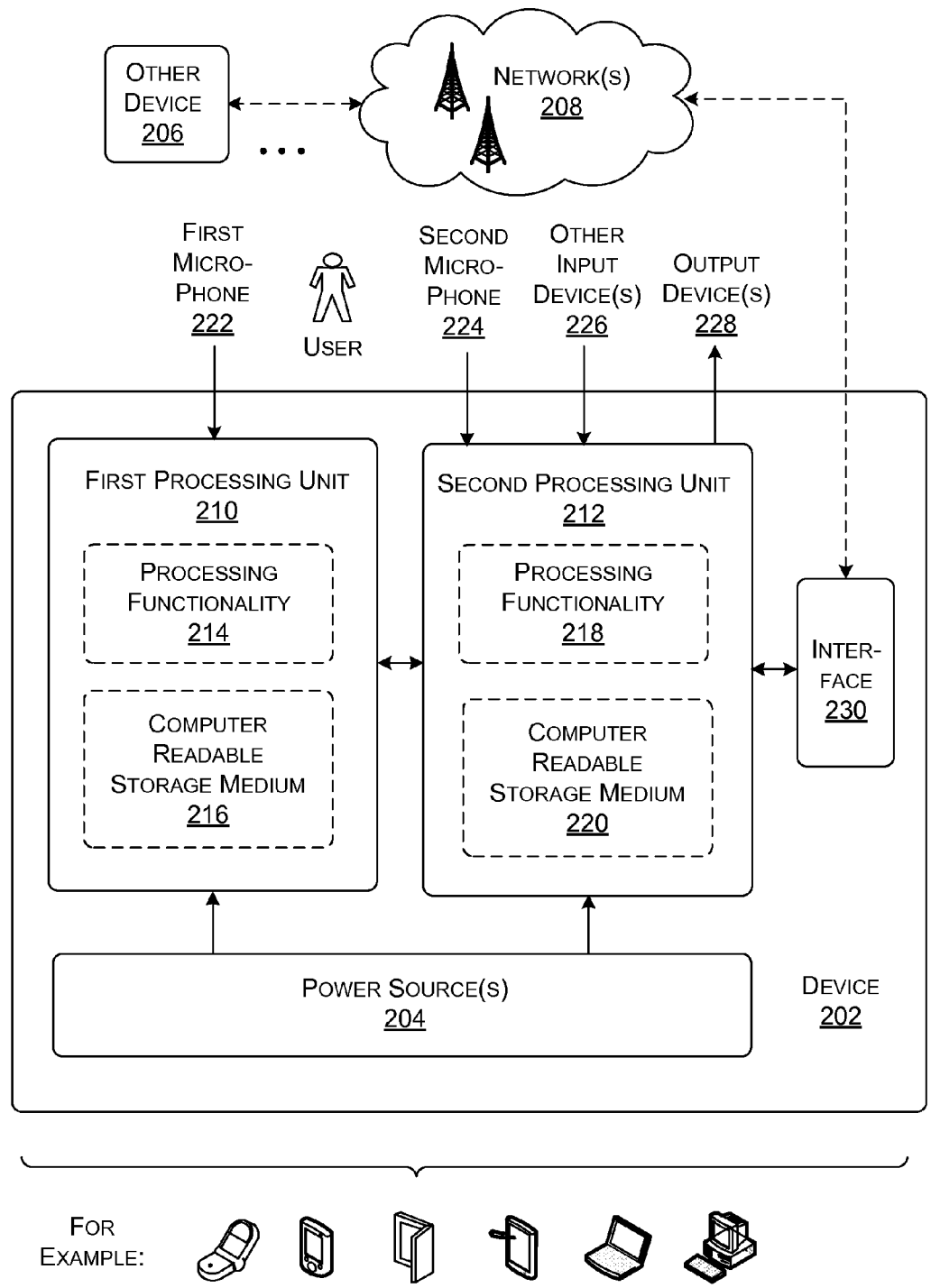
FIG. 2 shows one implementation of the system of FIG. 1.

FIG. 2 shows a device 202 that represents a specific implementation of the device 104 shown in FIG. 1. For example, the device 202 may comprise a portable communication device of any type, such as a mobile telephone of any type, a personal digital assistant (PDA) device, a book reader device, a tablet type computing device, a laptop computing device, a portable game device, and so on. The portable communication device typically has a power source 204 that comprises a rechargeable battery, having limited power capacity. However, in another case, the device 202 may comprise any type of traditionally fixed computing device, which may have a limited (rechargeable) power source and/or a constant power source. Such computing devices may comprise a personal computer, a computer workstation, a game console device, a set-top box device, and so on.

Nevertheless, to facilitate explanation, it will be assumed in the following description that the device 202 represents a mobile telephone of any type or the like. In that context, the device 202 can communicate with at least one other device 206 via a network 208 of any type. The network 208 may encompass communication infrastructure for transmitting wireless signals according to any protocol, including cell towers, base stations, switching stations, etc. In addition, or alternatively, the network 208 may encompass aspects of a hardwired local area network and/or a wide area network (e.g., the Internet).

The device 202 can include two or more processing units, such as a first processing unit 210 and a second processing unit 212. In one case, a single chip can implement the processing units (210, 212). In another case, two or more chips can implement the processing units (210, 212). In one case, the first processing unit 210 may utilize a less complex architecture compared to the second processing unit 212. This allows the first processing unit 210 to consume less power than the second processing unit 212. To leverage this feature, in the manner summarized with respect to FIG. 1, the device 202 can allocate frequently-performed lower-end tasks to the first processing unit 210 without invoking the resource-intensive operations of the second processing unit 212, thereby saving energy overall.

Each processing unit (210, 212) can include processing functionality for performing processing tasks and a computer readable storage medium for storing instructions and data. For example, the processing functionality can include logic for executing instructions that are stored in the computer readable storage medium. In part, the instructions implement the operations attributed to the different modules set forth with respect to FIG. 1.

More specifically, FIG. 2 shows that the first processing unit 210 includes processing functionality 214 and a computer readable storage medium 216. The second processing unit 212 includes processing functionality 218 and a computer readable storage medium 220. The term computer readable storage medium encompasses one or more units of any type for storing information, such as RAM memory, ROM memory, etc. Alternatively, or in addition, the first processing unit 210 and/or the second processing unit 212 can include "hardwired" logic components for performing their assigned tasks.

The first processing unit 210 and the second processing unit 212 may interact with various peripherals. For example, the first processing unit 210 may receive an audio signal from a first microphone 222, and the second processing unit 212 may receive an audio input from a second microphone 224. As noted above with respect to FIG. 1, the first microphone 222 may be the same as or different from the second microphone 224. The second processing unit 212 can also receive other input signals from other input devices 226, such as a keyboard, a touch-sensitive input device, an accelerometer sensor, an n-axis gyro device, a location determination device (such as a GPS device), and so forth. The second processing unit 212 can also provide output information to one or more output devices 228, such as a screen device, a speaker device, and so on. The second processing unit 212 can also send and receive communication signals to and from the other device 206 via an interface device 230. The interface device 230 may incorporate an antenna and appropriate circuitry for transmitting and receiving wireless signals.

Figure 3:
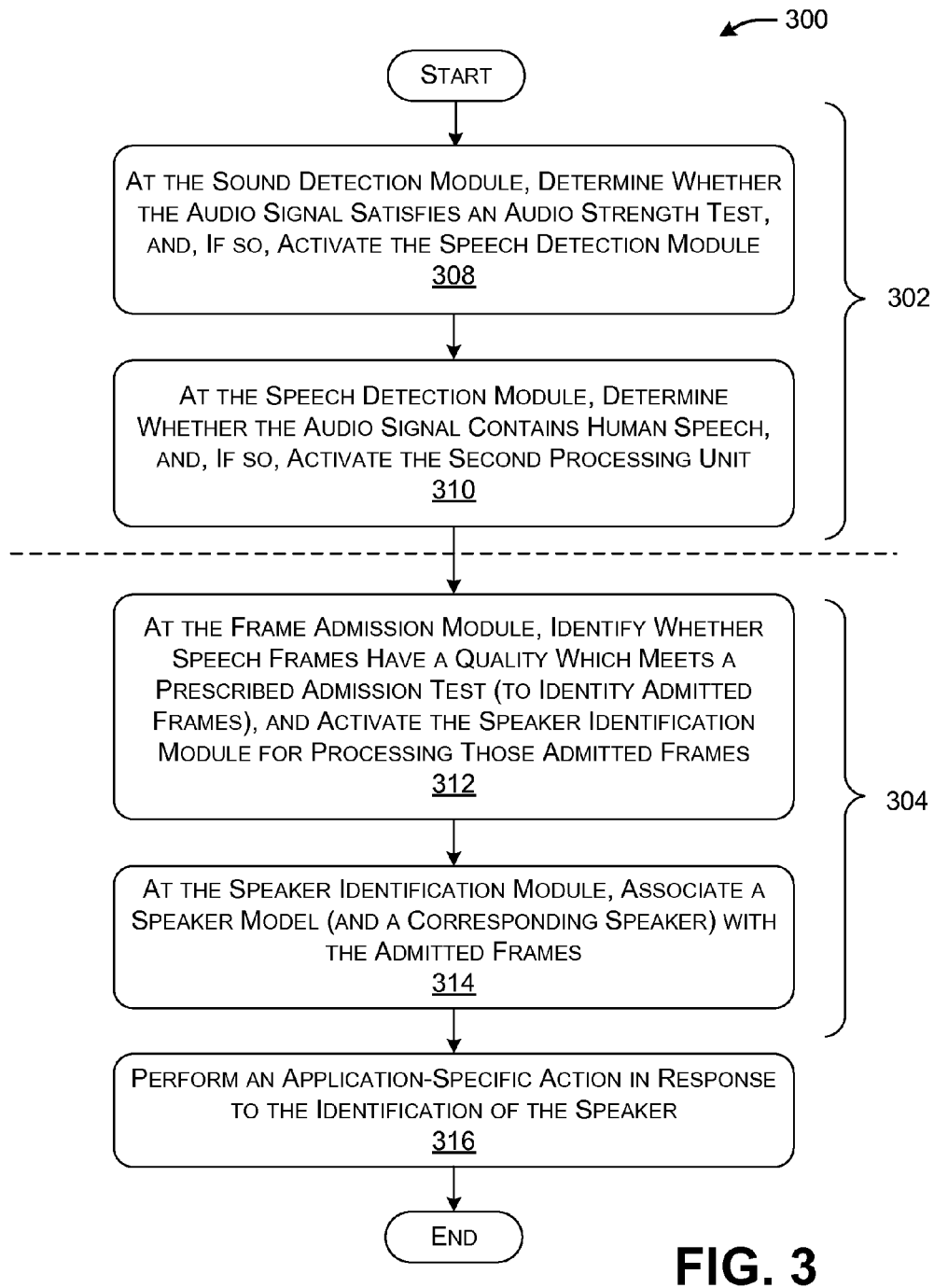
FIG. 3 is a flowchart that shows an overview of one manner of operation of the system of FIG. 1.

FIG. 3 shows a procedure 300 which presents an overview of one manner of operation of the system 100 of FIG. 1. (Henceforth, the functions of the system 100 will be described in the context of the more general depiction of FIG. 1, rather than the particular implementation of FIG. 2). Since these functions have already been described above, FIG. 3 will be set forth in summary fashion below.

From a high-level perspective, the procedure involves a first set of audio processing tasks 302 that are performed by the first processing unit 106 and a second set of audio processing tasks 304 that are performed by the second processing unit 108.

As to the first set of audio processing tasks 302, in block 308, the sound detection module 114 first determines whether a received audio signal satisfies an audio strength test. If so, the sound detection module 114 activates the speech detection module 116. In block 310, the speech detection module 116 then determines whether the audio signal contains human speech. If so, the speech detection module 116 activates the second processing unit 212.

As the second set of audio processing tasks 304, in block 312, the frame admission module 120 identifies whether speech frames, obtained from the audio signal, have a quality which meets a prescribed admission test. Such frames that satisfy the admission test constitute admitted frames according to the terminology used herein. In block 314, the speaker identification module 122 compares the admitted frames against the set of speaker models 124 over a smoothing window and identifies the speaker model that most closely matches the admitted frames. This speaker model corresponds to a particular user who is most likely represented by the audio signal.

In block 316, the device (or some other functionality) performs an application-specific action in response to the identification of the speaker in block 314.

B. Illustrative Processing Phases

This section describes the operations performed by the sound detection module 114, the speech detection module 116, the frame admission module 120, and the speaker identification module 122 in greater detail, according to one illustrative implementation of these functions. Other ways of implementing these functions are possible.

B.1. Operation of the Sound Detection Module

Figure 4:
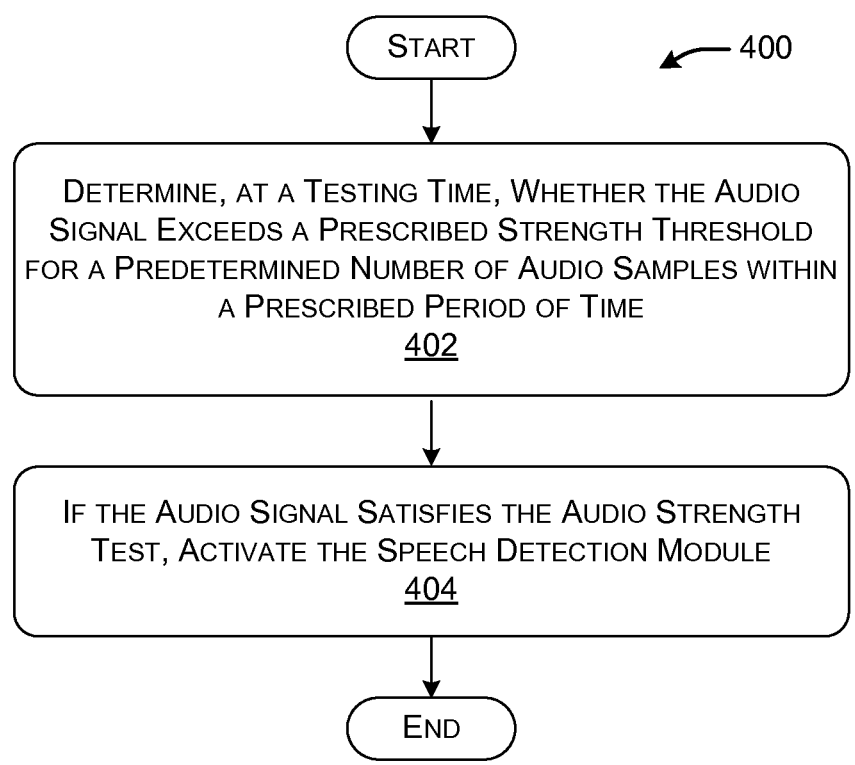
FIG. 4 is a flowchart that shows one manner of operation of a first phase of the procedure described in FIG. 3.

FIG. 4 shows a procedure 400 that represents one implementation of the sound detection module 114. In block 402, the sound detection module 114 can periodically determine whether the audio signal (received from the first microphone 110) satisfies an audio strength test. For example, the sound detection module 114 can determine whether the audio signal exceeds a prescribed strength threshold for a predetermined number of audio samples within a prescribed period of time. For example, in one merely representative implementation, the sound detection module 114 can determine whether the audio signal exceeds the strength threshold for more than 50 audio samples out of 1000 audio samples within a 0.5 second interval of time. In one case, the sound detection module 114 can perform this testing based on an output signal of a dedicated hardware circuit; the hardware circuit can generate the output signal when the audio signal exceeds the strength threshold at a particular instance of time. In block 404, if the audio signal has been determined to meet the test of block 402, then the sound detection module 114 activates the speech detection module 116.

B.2. Operation of the Speech Detection Module

Figure 5:
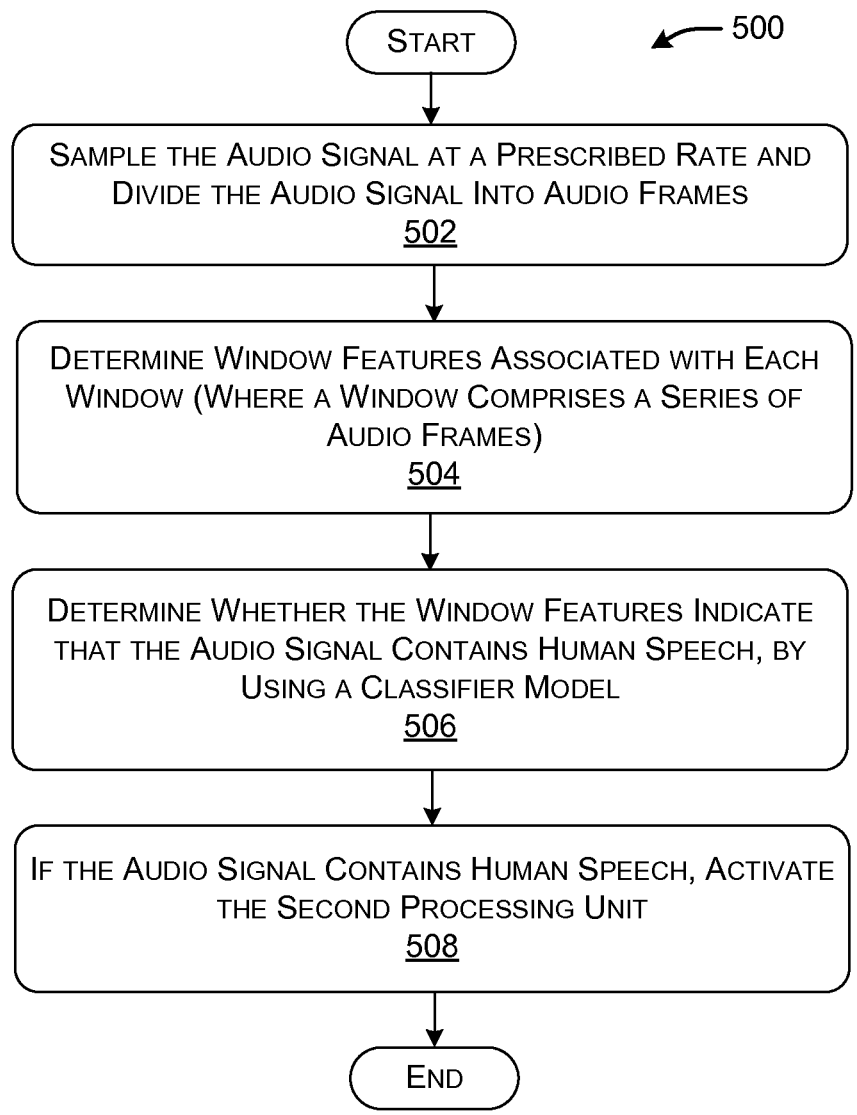
FIG. 5 is a flowchart that shows one manner of operation of a second phase of the procedure described in FIG. 3.

FIG. 5 shows a procedure 500 that represents one implementation of the speech detection module 116. In block 502, the speech detection module 116 samples the audio signal (received from the first microphone 110) at a prescribed sampling rate, such as, without limitation, 8 kHz or 16 kHz (although larger or smaller sampling rates can also be used). The speech detection module 116 then divides the audio signal into audio frames. In one case, each audio frame describes a 32 millisecond segment of the audio signal that includes 256 audio samples.

In block 504, the speech detection module 116 then computes lightweight time-domain features for each audio frame which characterize the audio frame. For example, for each audio frame, the speech detection module 116 can compute a zero crossing rate (ZCR) value and a root mean square (RMS) value. The ZCR value describes a number of zero-crossings within the audio frame. This feature can be computed as:

$$ZCR = \frac{\sum_{i=2}^{N} |\text{sign}(s_i) - \text{sign}(s_{i-1})|}{2}. \quad (1)$$

In this expression, $(s_i, s_{i+1}, \ldots s_N)$ refer to the audio samples in the audio frame, and N refers to the number of audio samples in the audio frame. The expression sign(x) has a value which is +1 or −1 based on whether x is greater than zero or x is less than zero, respectively. As such, the ZCR value increases by one whenever two consecutive samples have opposite signs. From a high-level perspective, the ZCR value serves as a time-domain approximation of voice pitch within the particular audio frame in question. An audio frame that predominantly contains non-speech noise will exhibit no inherent pitch, corresponding to a high ZCR value. In contrast, an audio frame that contains human speech (particularly speech associated with annunciated vowels) will exhibit a low ZCR value.

The RMS value represents the energy of the sound within an audio frame, and can be defined as:

$$RMS = \sqrt{\frac{\sum_{i=1}^{N} s_i^2}{N}}. \quad (2)$$

In this expression, $(s_i, s_{i+1}, \ldots s_N)$ and N have the same meaning set forth above. The execution of Expression (2) involves floating point calculations, which are processor-intensive operations. To avoid these calculations, the speech detection module 116 can alternatively execute the following integer approximation of the RMS value:

$$RMS_{approx} = \sqrt{\frac{\sum_{i=1}^{N} |s_i|}{N}}. \quad (3)$$

After calculating these per-frame features (ZCR values and RMS values), the speech detection module 116 computes window features that characterize respective audio windows. More specifically, each audio window comprises a prescribed number of consecutive audio frames, such as, without limitation, 64 audio frames. Such an audio window corresponds to an approximately two second interval.

More specifically, in one implementation, the speech detection module 116 generates four window features for each audio window. A first window feature corresponds to the mean of the per-frame ZCR values within the audio window. A second window feature corresponds to the variance of the per-frame ZCR values within the audio window. A third feature corresponds to the variance of the per-frame RMS values within the audio window. The ZCR and RMS variances can be approximated by the following expression:

$$VAR_{approx} = \frac{\sum_{i=1}^{N} |s_i - \mu|}{N}. \quad (4)$$

In this expression, $(s_i, s_{i+1}, \ldots s_N)$ and N have the same meaning set forth above. The symbol μ refers to the mean of the sequence $(s_i, s_{i+1}, \ldots s_N)$. Finally, the fourth window feature corresponds to a low energy frame rate. This feature may be approximated as a number of audio frames within the audio window that have an RMS value less than half of the means RMS value for the entire audio window.

In block 506, the speech detection module 116 then feeds the generated window features into the classification model 118. The classification model 118 determines whether the audio window under consideration represents an audio signal that is characteristic of human speech or other non-human noise. More generally, human speech, in contrast to non-human sounds, comprises fluctuations that result from the rapid interleaving of consonants and vowels; the classification module 118 can distinguish speech from non-speech on this basis.

The system 100 of FIG. 1 can produce the classification model 118 in an offline manner by training the model based on a corpus of audio samples that have been appropriately labeled as human speech sounds and non-human sounds, respectively. The classification model 118 may comprise a decision tree classifier.

B.3. Operation of the Frame Admission Module

Figure 6:
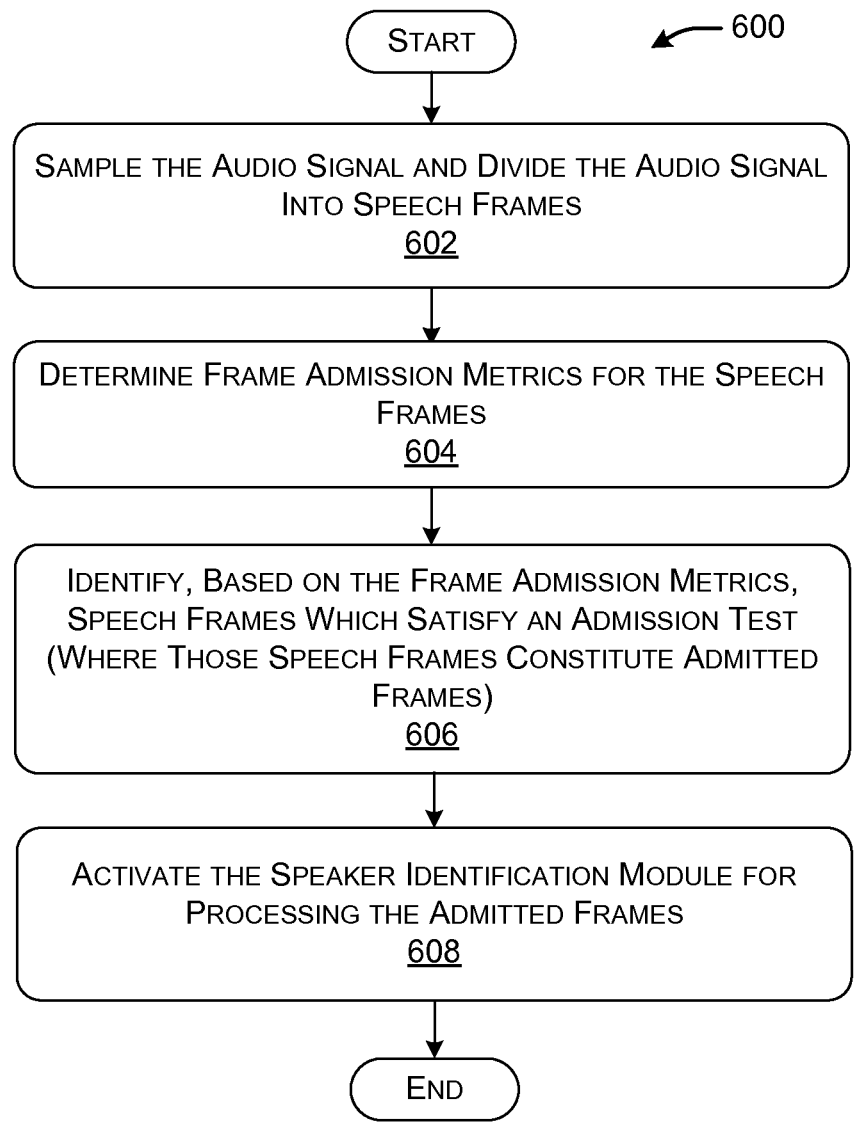
FIG. 6 is a flowchart that shows one manner of operation of a third phase of the procedure described in FIG. 3.

FIG. 6 shows a procedure 600 that represents one implementation of the frame admission module 120 of the second processing unit 108. In block 602, the frame admission module 120 samples the audio signal (received from the second microphone 112) into a plurality of speech frames in the manner described above. At this juncture, the frames are referred to as speech frames, rather than audio frames, because there is a reasonable likelihood that they contain speech.

In block 604, the frame admission module 120 generates frame admission metrics that characterize the speech frames. In one case, the frame admission module 120 uses two frame admission metrics per frame to characterize the frames: the ZCR value and a spectral entropy value. The ZCR value is computed in the manner described above. The frame admission module 120 can generate the spectral entropy metric in any manner. Background information regarding the general topic of spectral entropy is described, for example, in Huang, et al., "A Novel Approach to the Robust Speech Endpoint Detection in Car Environments," in ICASSP '00, May 2000, Vol. 3, pp. 1751-1754. More specifically, in one approach, the frame admission module 120 calculates the spectral entropy metric by first computing the Fast Fourier Transform (FFT) of the audio signal within a speech frame. The frame admission module 120 then generates a probability density function (pdf) of the spectrum of the FFT-transformed speech frame, e.g., using the expression:

$$e_i = \frac{s(f_i)}{\sum_{k=1}^{M} s(f_k)}. \tag{5}$$

In this expression, $e_i$ refers to the probability density formed over M frequency components in the FFT-transformed speech frame. The symbol $s(f_i)$ refers to the spectral energy of a frequency component $f_i$. The spectral entropy ($SE_j$) value of a frame j can then be computed as:

$$SE_j = \sum_{i=1}^{M} e_i \log e_i. \tag{6}$$

In block 606, the frame admission module 120 can then determine which speech frames in the audio signal constitute admitted frames based on the frame admission metrics computed in block 604. Generally stated, instances of human speech can be classified as voiced speech or unvoiced speech. A user produces voiced speech from vibrations of the vocal chords, e.g., when the user is making a vowel sound. A user produces unvoiced speech without using the vocal chords, e.g., when the user is making a consonant sound. In the present application, the frame admission module 120 selects voiced speech over unvoiced speech because voiced speech has more energy than unvoiced speech, making it less susceptible to background noise compared to unvoiced speech. The frame admission module 120 also excludes speech frames that contain instances of silence in speech (e.g., when the user pauses while speaking), and instances of noisy speech.

More specifically, the frame admission module 120 can perform block 606 by determining, for each speech frame, whether the ZCR value satisfies a first threshold and determining whether the spectral entropy value satisfies a second threshold. For example, voiced speech includes a series of strong peaks in its spectrum. Hence, voiced speech typically exhibits low spectral entropy. In contrast, non-speech or low-quality speech signals typically have a fairly flat spectral profile, resulting in a high spectral entropy value. Based on this observation, for example, the frame admission module 120 can indicate that a speech frame which has a spectral entropy value below a prescribed threshold passes the spectral entropy test.

In block 608, the frame admission module 120 activates the speech identification module 122 for processing the admitted frames. By virtue of this processing, the device 104 as a whole can reduce the amount of energy-intensive operations that are performed on audio signals that are predominantly characterized by low-quality human speech.

B.4. Operation of the Speaker Identification Module

Figure 7:
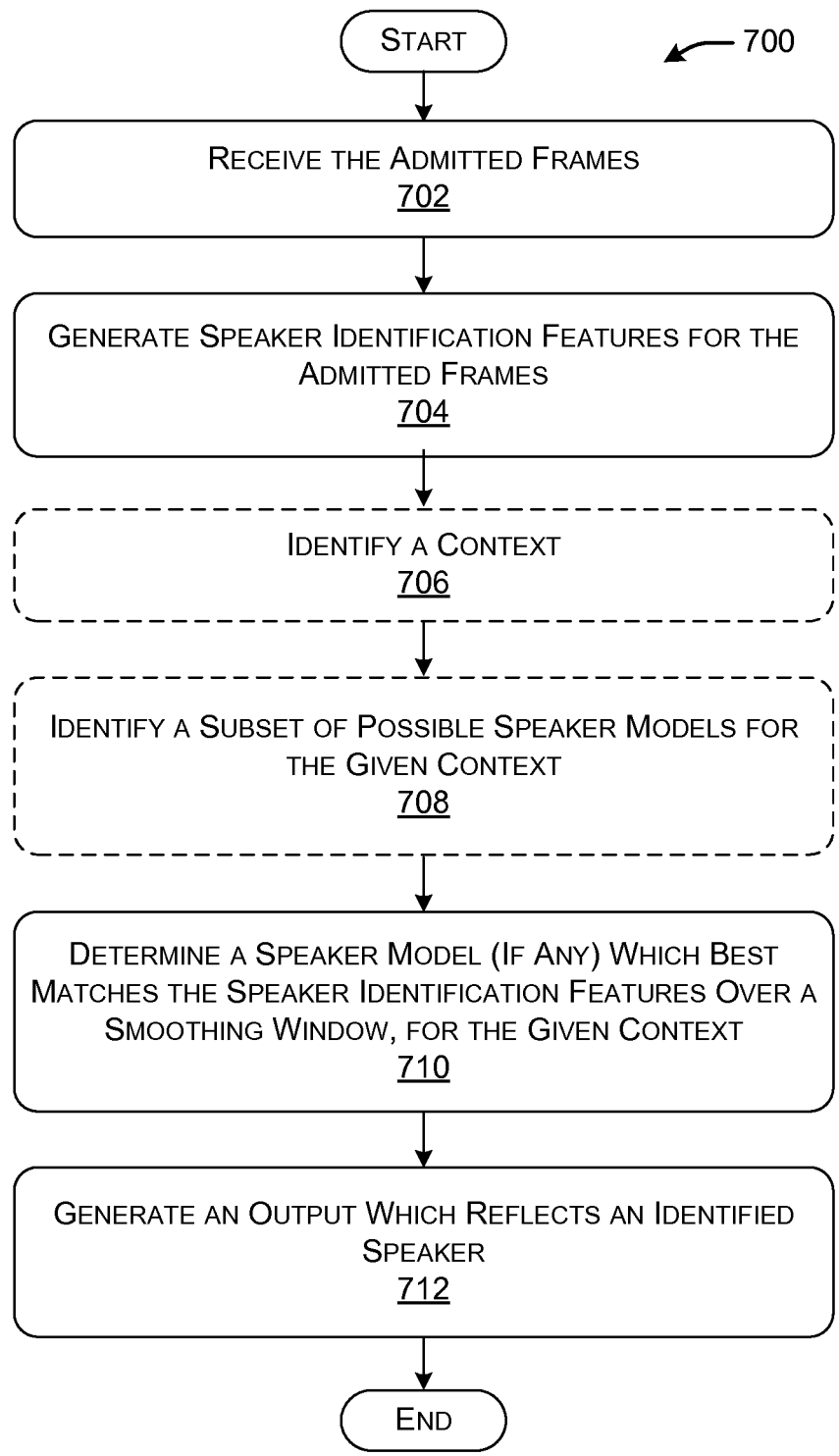
FIG. 7 is a flowchart that shows one manner of operation of a fourth phase of the procedure described in FIG. 3.

FIG. 7 shows a procedure 700 that represents one implementation of the speaker identification module 122. In block 702, the speaker identification module 122 receives the admitted frames from the frame admission module 120. In block 704, the speaker identification module 122 generates speaker identification features for the admitted frames. That is, the speaker identification module 122 can generate a feature vector for each admitted frame; that feature vector specifies a number of features that characterize the frame for the purpose of speaker identification.

In one case, for each frame, the feature vector includes a representation of pitch and Mel-frequency cepstral coefficients (MFCCs). The speaker identification module 122 can compute pitch using any pitch determination algorithm. Background information on the general topic of pitch detection algorithms can be found, for instance, in Rabiner, et al., "A Comparison Performance Study of Several Pitch Detection Algorithms," *IEEE Transactions on Acoustics, Speech, and Signal Processing*, October 1976, pp. 399-418. A first type of pitch detection algorithm determines pitch based on the time-domain characteristics of an audio signal. A second type of pitch detection algorithm determines pitch based on the frequency-domain characteristics of the audio signal. A third type of pitch detection algorithm determines pitch based on a combination of the time-domain and frequency-domain characteristics of the audio signal.

The Mel-frequency cepstral coefficients describe coefficients that constitute a Mel-frequency cepstrum (MFC). General background information on the topic of the generation of MFCCs can be found, for example, in Zheng, et al., Comparison of Different Implementations of MFCC," *Journal of Computer Science & Technology*, 16(6), 2001, pp. 582-589. In the context of the procedure 700, in one implementation, the speaker identification module 122 can compute 20-dimensional MFCCs. The speaker identification module 122 can then discard the first coefficient (which represents the energy of the frame), leaving the $2^{nd}$ through the $20^{th}$ coefficients (representing the spectral shape of the audio signal in the admitted frame). In performing this computation, the speaker identification module 122 can use either non-overlapping frames or overlapping frames.

In block 710, the speaker identification module 122 determines a speaker who is represented by the audio signal, based on the speaker identification features determined in block 704. More specifically, at each instance, the speaker identification module 122 performs this analysis with respect to a smoothing window. The smoothing window comprises a fixed number of successive admitted frames. In one implementation, the smoothing window is less than 10 seconds (although other implementations can choose longer lengths for the smoothing window). For each such window, the speaker identification module 122 finds the speaker model, selected from among the possible set of speaker models 124, which most closely describes the speaker identification features of the window.

More specifically, for each frame in the smoothing window, each speaker model computes the log likelihood that the audio signal matches the model, given that frame's feature vector. Each speaker model then computes the sum of the log likelihood values over the entire smoothing window. The speaker identification module 122 then identifies the speaker model that yields the highest sum as the model which most closely represents the audio signal for the particular smoothing window under consideration.

In one case, each speaker model can be constructed as a Gaussian Mixture Model (i.e., a "GMM model"). General background information on the topic of Gaussian Mixture models, and a method of training such models using the Expectation-Maximization (EM) technique, can be found, for instance, in Reynolds, et al., "Robust Text-Independent Speaker Identification Using Gaussian Mixture Speaker Models," *IEEE transactions on Speech and Audio Processing*, Vol. 3, No. 1, 1995, pp. 72-83. A GMM model corresponds to a weighted sum of density components. Each component ($h_i(x_i)$) of this sum can be expressed as:

$$h_i(x_i) = \frac{1}{(2\pi)^{D/2}|\Sigma_i|^{1/2}} \exp\left\{-\frac{1}{2}(x-\mu_i)^T \sum_i^{-1} (x-\mu_i)\right\}. \quad (7)$$

In this expression, $x_i$ refers to a random vector having a dimension D. The symbol $\mu_i$ refers to the mean vector of the GMM model, and $\Sigma_i$ refers to the covariance matrix for the GMM model. In the weighted sum, the component $h_i(x_i)$ is weighted by a parameter $w_i$. Overall, the parameters $w_i$, $\mu_i$, and $\Sigma_i$ characterize a particular GMM model. The training functionality 102, described next in Section C, computes these parameters in an offline manner and serializes them into configuration files. The training functionality 102 then downloads the files to recipient devices, such as device 104 of FIG. 1 (where such files constitute the speaker models 124). In one implementation, the training functionality 102 provides the pre-computed inverse and determinant of the covariance matrix as the model parameters, rather than the covariance matrix itself.

In block 712, the speaker identification module 122 generates an output which reflects an identified speaker (where the identified speaker is the speaker who is associated with the speaker model having the highest sum of log likelihood values).

Blocks 706 and 708 represent optional operations that may render the procedure 700 more efficient and potentially more accurate. In block 706, the speaker identification module 122 determines a context associated with the production of the audio signal. That is, the context may correspond to a setting in which the audio signal is presumed to have been produced. For example, the context may indicate that the user is present at a workplace. The speaker identification model 122 can mine any resources to determine context information, including time-of-day information, location information (e.g., gleaned from GPS information or the like), calendar information (which may indicate with whom the user is speaking at the moment), and so on (or any combination of these resources).

In block 708, the speaker identification module 122 selects a subset of possible speaker models (from the entire set of speaker models 124) which are appropriate for the context identified in block 706. For example, again assume that the context indicates that the user is at a workplace at the present time. The speaker identification module 122 can select a subset of speaker models that correspond to the user's work colleagues. Block 710 can then be performed by analyzing the subset of speaker models, not the entire set of speaker models 124.

C. Illustrative Training Functionality

Figure 8:
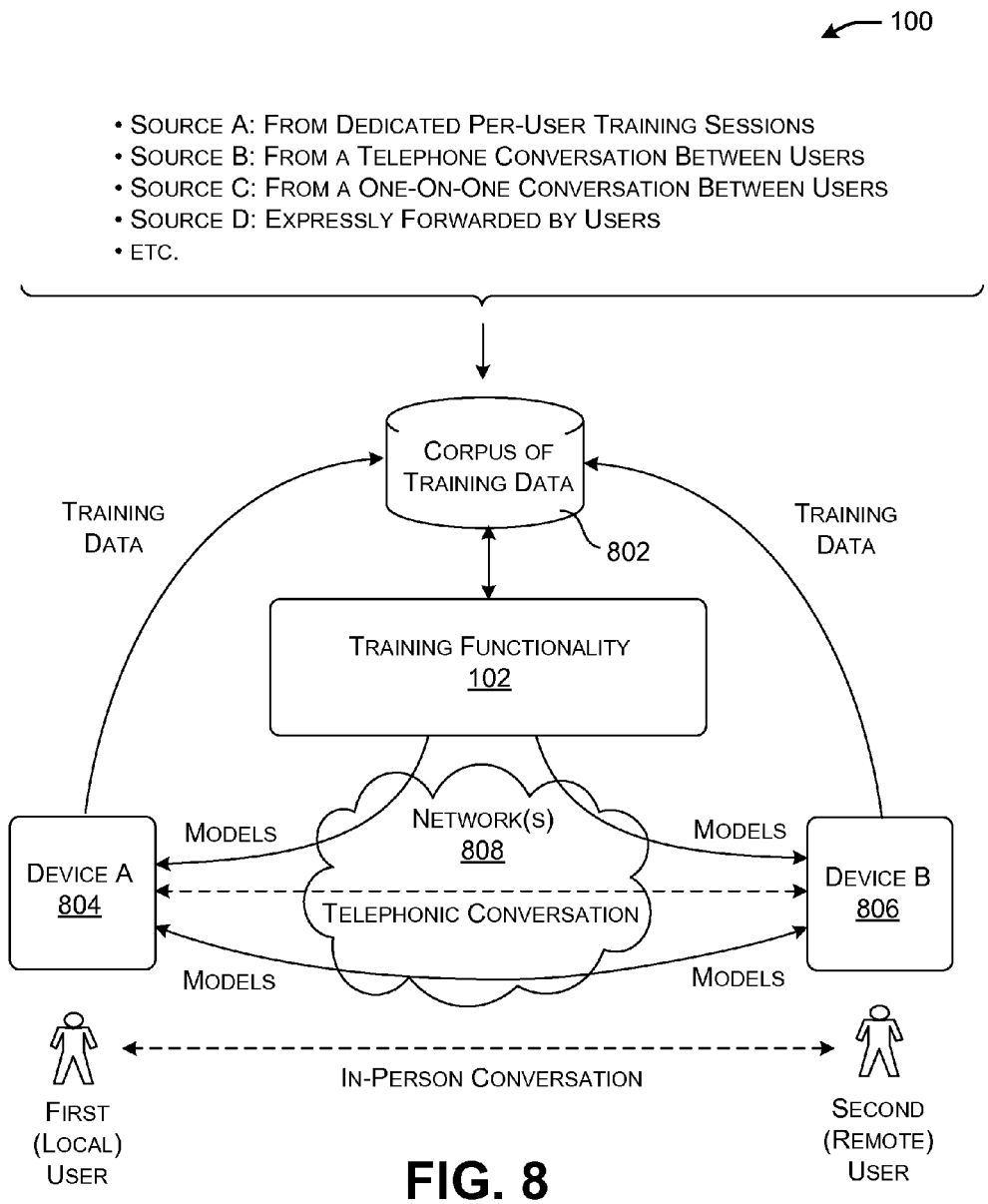
FIG. 8 shows a system for training speaker models for various usage scenarios.

FIG. 8 shows a system 800 in which the training functionality 102 produces the speaker models 124 based on training data in a data store 802. The training data comprises a corpus of audio segments. Each audio segment represents the speech of one or more users.

In one case, the system 800 implements the training functionality 102 as an entity which is separate from each device (such as representative device A 804 and device B 806). For example, the training functionality 102 can represent one or more servers that are remotely located from the devices (804, 806), e.g., as provided in a cloud-computing service or some other remote service. In that case, the training functionality 102 can be coupled to the devices (804, 806) via any type of network 808, such as a wide area network, a local area network, a point-to-point connection, and so on. The remote training functionality 102 can download the speaker models to the devices (804, 806) via the network 808. The remote training functionality 102 can update the models on any basis, e.g., in a periodic manner and/or an event-driven manner (e.g., after a new speaker model has been generated by the training functionality 102).

In another case, the training functionality 102 can represent computing functionality that is local with respect to one or more devices. For example, assume that device A 804 corresponds to a portable computing device owned by a user. The training functionality 102 may correspond to a personal computing device, also owned by the user. The user may couple the device A 804 to the local training functionality 102 using any local communication coupling mechanism, such as a USB coupling mechanism or the like.

In a third case, the training functionality 102 can be entirely implemented by each device, e.g., as a module within the device A 804 and a module within the device B 806. In a fourth case, part of the training functionality 102 can be implemented by one or more servers that are remote from the devices (804, 806) and part of the training functionality 102 can be implemented by the devices (804, 806) themselves. Still other implementations are possible.

FIG. 8 also outlines four possible approaches that the training functionality 102 can employ to generate the speaker models. In a first approach, an administrator may ask each user to expressly provide a sample of his or her speech (referred to herein as an audio segment). For example, the administrator may ask each user to read from a prepared script in a controlled low-noise environment to create the audio segment. This approach is categorized herein as an obtrusive approach because the user is asked to perform a single-purpose task to generate an audio segment.

Figure 10:
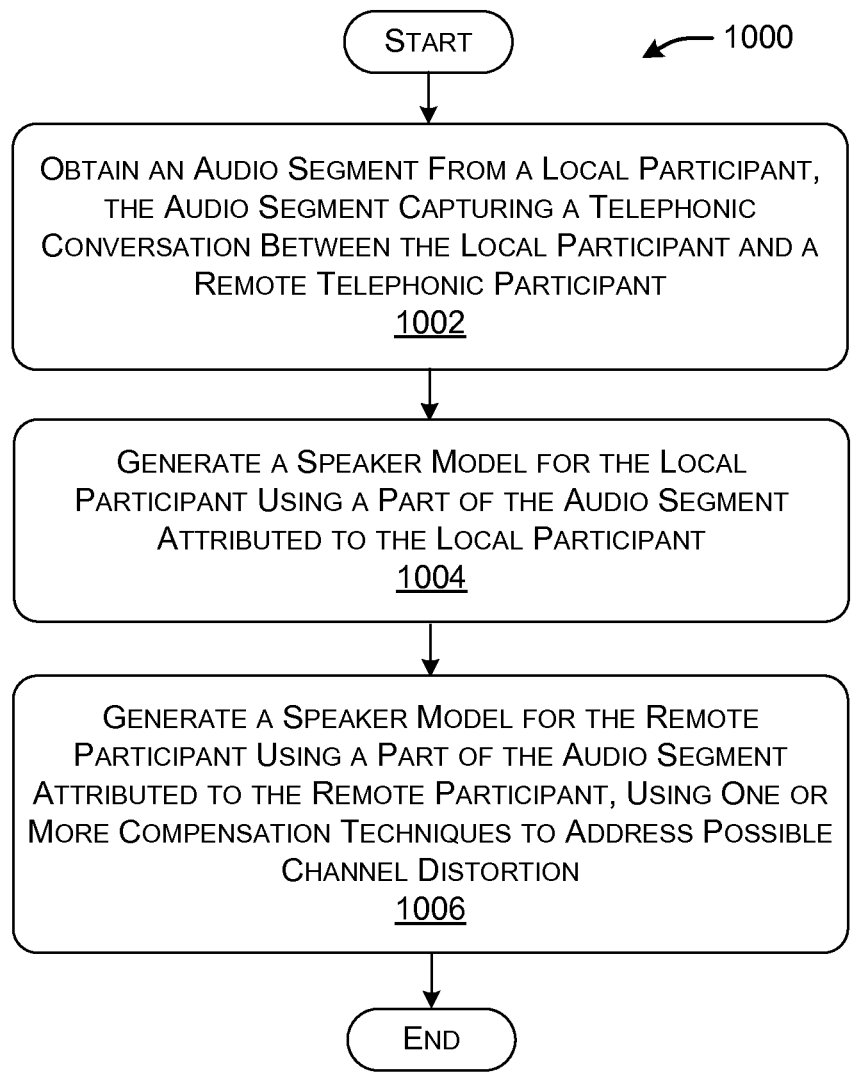
FIG. 10 is a flowchart that shows a first manner of obtaining and processing an audio segment; here, the audio segment captures a telephonic conversation between a local participant and a remote participant.
Figure 11:
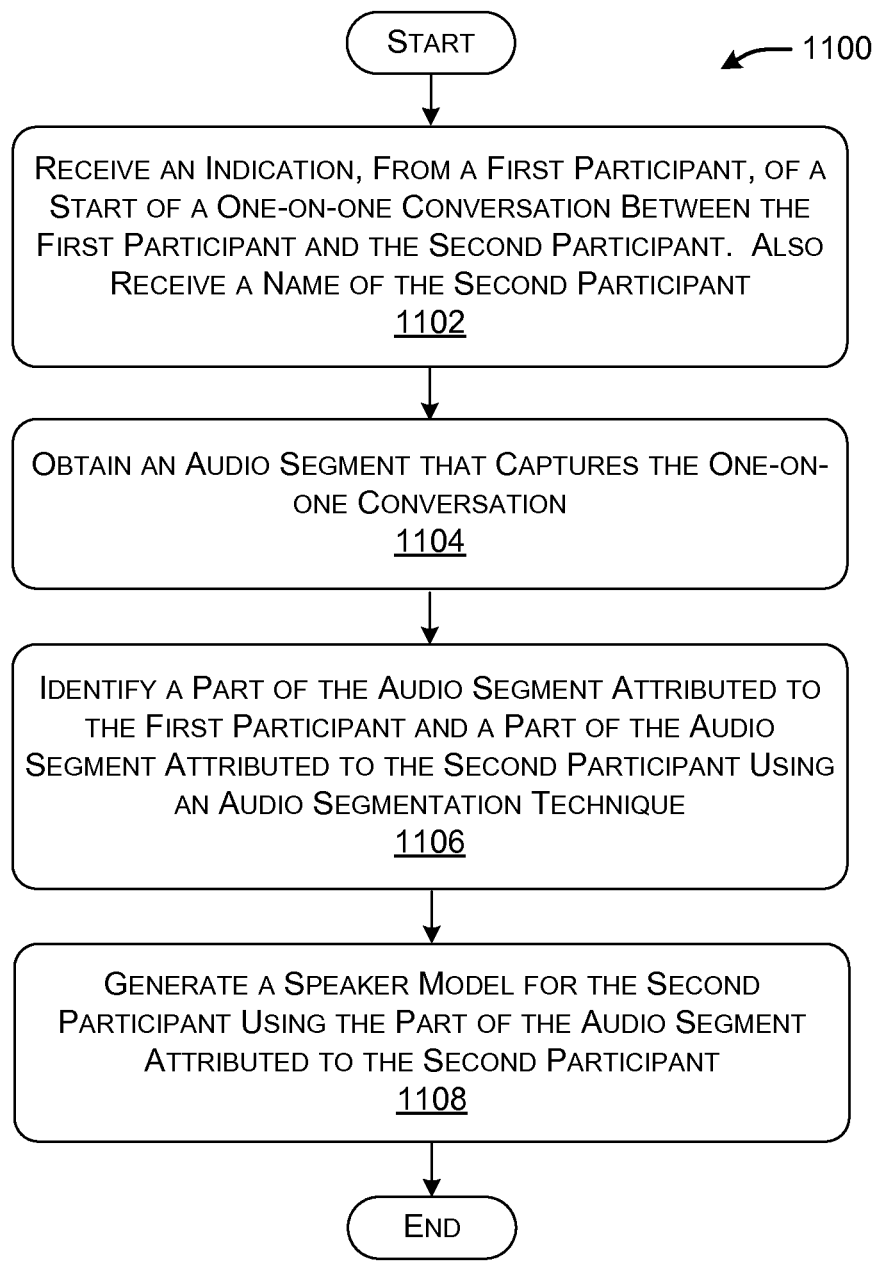
FIG. 11 is a flowchart that shows a second manner of obtaining and processing an audio segment; here, the audio segment captures a one-on-one conversation between a first user and a second user.
Figure 12:
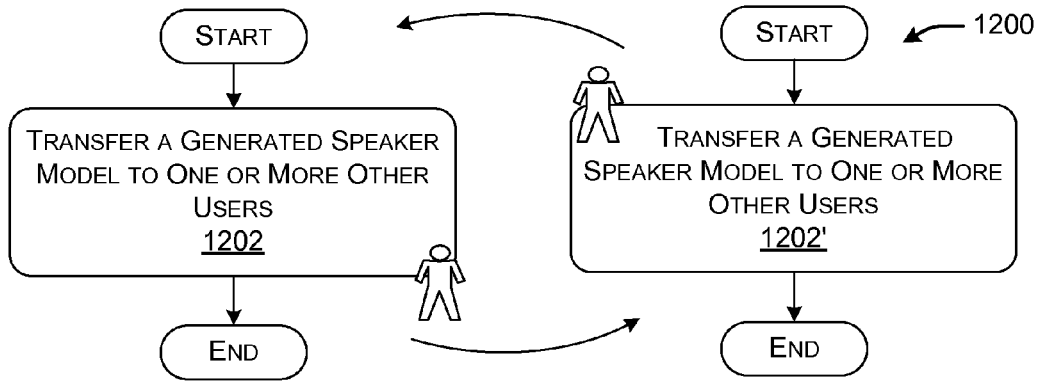
FIG. 12 is a flowchart that shows a technique whereby users may exchange speaker models with each other.
Figure 13:
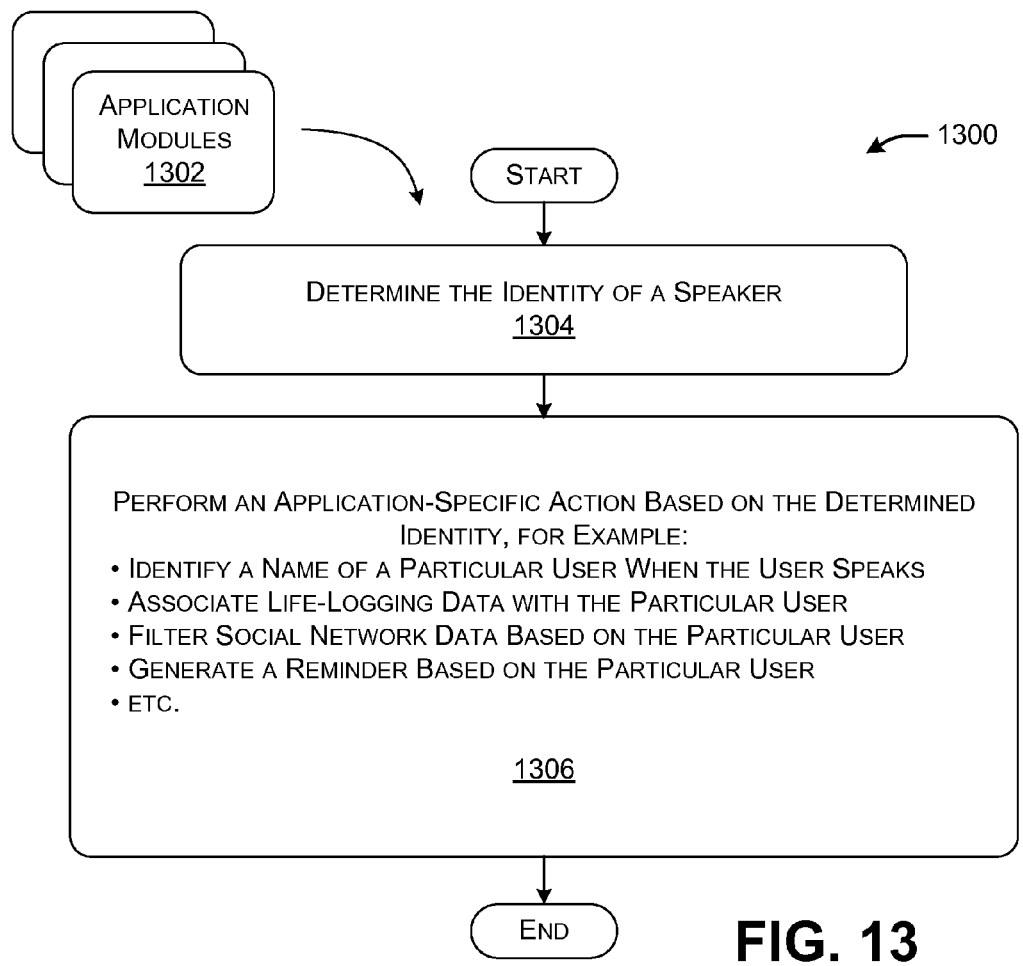
FIG. 13 is a flowchart that shows one manner of operation of one or more application modules. Each application module performs an application-specific action in response to the identification of a particular user.

The training functionality 102 can also rely on different unobtrusive techniques to generate audio segments. Generally, each such unobtrusive technique extracts the audio segments from everyday speech that the users engage in for everyday purposes. For example, the audio segments may be extracted from conversations between two or more users. The techniques are unobtrusive because the users are not asked to devote time to the particular purpose of creating the audio segments. FIGS. 10-12, described below, summarize three possible unobtrusive techniques for collecting audio segments from users.

Whatever approach is used to obtain the training data, the training functionality 102 can use any training technique to generate the speaker models for different respective users, as well as a universal speaker model. (The universal speaker model is generated based on audio segments associated with plural users.) In one approach, the training functionality 102 uses the expectation-maximization (EM) technique to generate the speaker models. To reduce the impact of noisy training data, the training functionality 102 can apply a variance limiting technique. The variance limiting technique applies a minimum variance condition that constrains the operation of the EM algorithm. Without limitation, in one example, the variance limiting can be set to 0.1.

More generally, different parameter values can be chosen to characterize the operation of the systems (100, 800) for different respective environments. For example, in one environment, the systems (100, 800) can employ a sampling rate of 8 kHz or 16 kHz. The systems (100, 800) can use a smoothing window of 3-5 seconds. (Some applications may have latency and/or accuracy requirements which require higher (or lower) sampling rates and/or higher (or lower) smoothing windows.) In one environment, the systems (100, 800) generate the speaker models based on at least a minimum of three minutes of training data. In one environment, the systems (100, 800) generate GMM models having 32 components.

Figure 9:
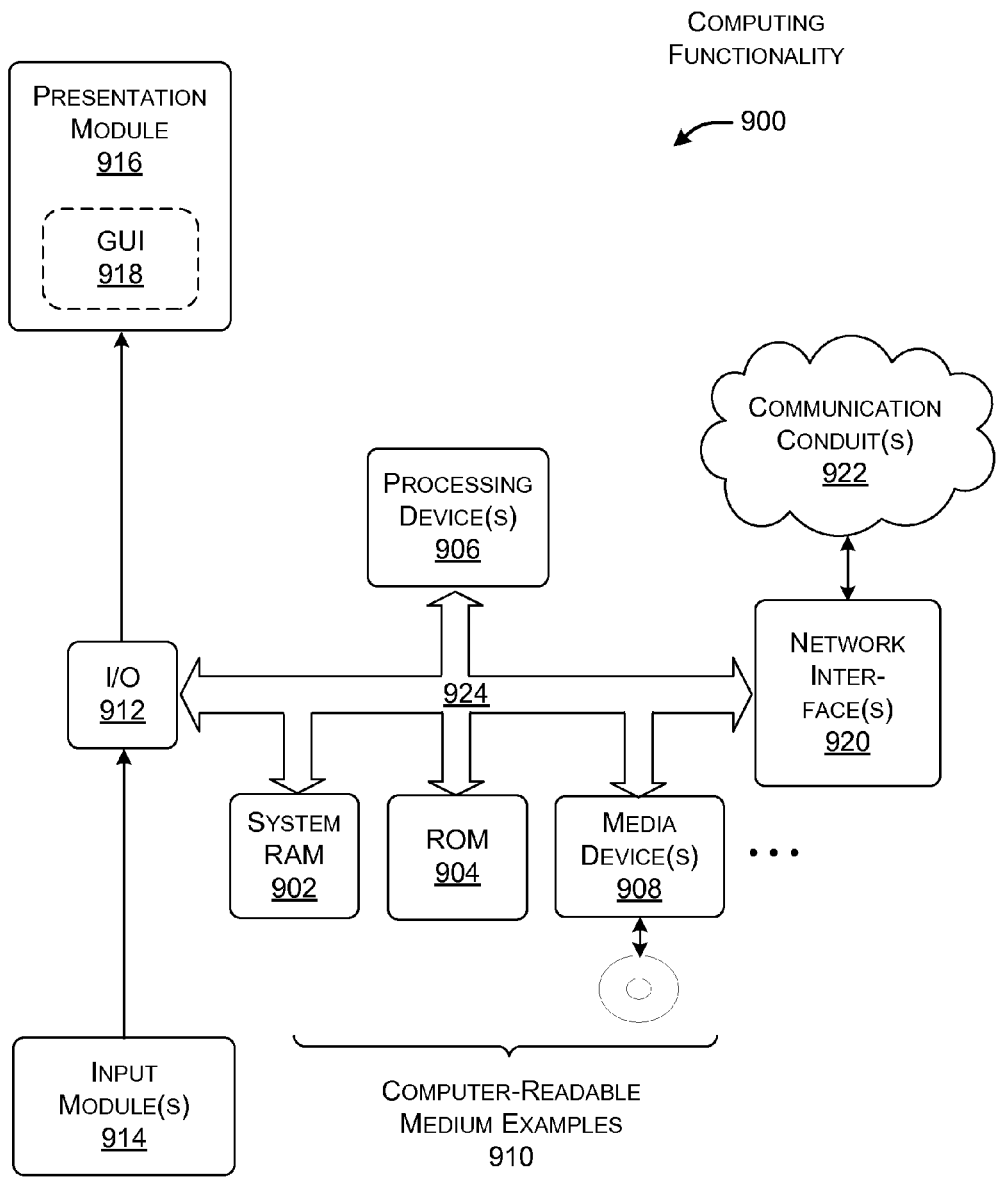
FIG. 9 shows computing functionality that can be used to implement training functionality shown in FIG. 8.

FIG. 9 sets forth illustrative computing functionality 900 that can be used to implement any aspect of training functionality 102. In one case, the computing functionality 900 may correspond to any type of computing device that includes one or more processing devices. In all cases, the computing functionality 900 represents one or more physical and tangible processing mechanisms.

The computing functionality 900 can include volatile and non-volatile memory, such as RAM 902 and ROM 904, as well as one or more processing devices 906 (e.g., one or more CPUs, and/or one or more GPUs, etc.). The computing functionality 900 also optionally includes various media devices 908, such as a hard disk module, an optical disk module, and so forth. The computing functionality 900 can perform various operations identified above when the processing device(s) 906 executes instructions that are maintained by memory (e.g., RAM 902, ROM 904, or elsewhere).

More generally, instructions and other information can be stored on any computer readable medium 910, including, but not limited to, static memory storage devices, magnetic storage devices, optical storage devices, and so on. The term computer readable medium also encompasses plural storage devices. In all cases, the computer readable medium 910 represents some form of physical and tangible entity.

The computing functionality 900 also includes an input/output module 912 for receiving various inputs (via input modules 914), and for providing various outputs (via output modules). One particular output mechanism may include a presentation module 916 and an associated graphical user interface (GUI) 918. The computing functionality 900 can also include one or more network interfaces 920 for exchanging data with other devices via one or more communication conduits 922. One or more communication buses 924 communicatively couple the above-described components together.

The communication conduit(s) 922 can be implemented in any manner, e.g., by a local area network, a wide area network (e.g., the Internet), etc., or any combination thereof. The communication conduit(s) 922 can include any combination of hardwired links, wireless links, routers, gateway functionality, name servers, etc., governed by any protocol or combination of protocols.

FIG. 10 shows a first procedure 1000 for generating speaker models in an unobtrusive manner. In block 1002, the training functionality 102 obtains an audio segment that is extracted from a telephone conversation between a local participant and a remote participant. For example, the telephone conversation may be conducted over wireless signals, over land lines, or some combination thereof.

The audio segment includes a first part that is attributed to the local participant and a second part that is attributed to the remote participant. The training functionality 102 can distinguish between the first part and the second part because these parts originate from different respective sources (e.g., different channels). For example, the part of the audio segment that is attributed to the local participant can be captured from the microphone of the telephone device being used by the local participant. The audio segment that is attributed to the remote participant can be captured from the audio signal that travels over a telephone channel to the local participant. Alternatively, the part of the audio segment that is attributed to the remote participant can be captured from the microphone of the telephone device being used by the remote participant.

In one case, the training functionality 102 can receive the audio segment from the first participant, or from a combination of the first participant and the second participant. More specifically, in one case, the local user can upload a digital file to the training functionality 102 which captures the audio segment, containing both the contribution of the local participant and the remote participant. In another case, the training functionality 102 can automatically extract the audio segment from any infrastructure component associated with the exchange of communication signals, such as from a base station, etc.

In one case, the training functionality 102 can also obtain information regarding the names (or other identifiers) of the local participant and the remote participant from caller ID information or the like. In addition, or alternatively, the local participant and/or the remote participant can manually supply their names or other identifiers.

In all scenarios described in this document, the system 800 can provide appropriate measures to ensure the security and privacy of personal information that pertains to users, including conversation information, speaker models, etc. For example, the system 800 can collect audio information from users only after the users expressly opt into the collection of such information. In addition, the system 800 can provide the users with full control over the manner in which audio information is used by the system 800, allowing, for instance, the users to delete such audio information at any time. Finally, the system 800 can apply appropriate security measures (such as encryption and/or password protection mechanisms) to reduce the possibility that unauthorized entities can gain access to the audio information.

In block 1004, after collecting the audio segment, the training functionality 102 can generate a speaker model for the local participant of the conversation. The training functionality 102 performs this operation based on the part the audio segment that is attributed to the local participant. Again, the part of the audio segment that is attributed to the local participant may originate from the microphone of the local participant's device. The training functionality 102 can generate a robust speaker model from this source insofar as the signal received from the local device's microphone is a strong noise-free signal, with no or minimal channel distortion.

In block 1006, the training functionality 102 generates a speaker model for the remote participant based on the part of the audio segment that is attributed to the remote participant. The part of the audio segment that is attributed to the remote participant may have undergone channel distortion in the course of it being transmitted to the local participant (presuming that the local participant is the entity which provides the audio segment to the training functionality 102, and not the remote participant). More specifically, the audio signal that is transmitted over the communication channel may have undergone band limit filtering and/or spectral shaping. In view of this issue, the training functionality 102 can apply one or more channel compensation techniques to improve the quality of the audio signal attributed to the remote participant. In one implementation, the training functionality 102 apply a frequency warping technique in conjunction with the use of delta MFCC features to offset the distortion in the audio signal attributed to the remote participant.

In the frequency warping approach, the training functionality 102 can map an original frequency ($f_{old}$) to a new frequency ($f_{new}$) based on the following equation:

$$f_{new} = \frac{f_{old} - f_{min}}{f_{max} - f_{min}} f_N. \quad (8)$$

In this expression, $f_{min}$ and $f_{max}$ identify the original bandwidth of the original audio signal and $f_N$ refers to the Nyquist frequency of the original audio signal. In one example, the frequency warping technique can be used to convert the bandwidth of a typical telephone channel (e.g., 300 to 3300 Hz) to a wider bandwidth (e.g., 0 to 4000 Hz).

Delta MFCC features describes features computed from differences between respective pairs of MFCC features. Without limitation, in one example, the training functionality 102 can use 19 difference coefficients from a 32 ms interval around a current frame under consideration.

FIG. 11 shows another procedure 1100 for generating speaker models in an unobtrusive manner. In this case, the training functionality 102 receives the audio segment from a one-on-one conversation between a first participant and a second participant. For example, the audio segment may describe a conversation between the first participant and the second participant during a meeting or casual exchange. In one application, the purpose of the procedure 1100 is to generate a speaker model for the second participant. The speaker model for the first participant is assumed to be known.

In block 1102, the training functionality 102 can receive an indication from one of the participants (such as the first participant) that the conversation has started. The training functionality 102 can also receive information from one or more of the participants (such as the first participant) regarding the name or other identifier of the second participant.

In block 1104, the training functionality 102 obtains an audio segment that describes the conversation. For example, in one case, one or more of the participants can upload the audio segment to the training functionality 102, either in real-time as the conversation is happening or after the conversation has taken place (and has been recorded). For example, the first participant can use his or her mobile telephone device to capture the conversation and send the audio segment to the training functionality 102.

In block 1106, the training functionality 102 applies a segmentation algorithm to discriminate between a part of the audio segment attributed to the first participant and a part of the audio segment attributed to the second participant. This operation is performed because the two parts of the audio segment no longer are associated with distinct channels, as was the case for the procedure 1000 of FIG. 10.

In one approach, the segmentation algorithm involves analyzing the audio segment with respect to an already-trained speaker model for the first participant and an already-trained universal speaker model. Based on this analysis, the training functionality 102 can discriminate the part of the audio segment that is attributed to the second participant from the part of the audio segment that is attributed to the first participant. That is, the part of the audio segment that best matches the first participant's speaker model corresponds to the first participant's speech. The part of the audio segment that best matches the universal speaker model corresponds to the second participant's speech. In other words, the first participant's speaker model has a higher likelihood for the first person's speech; the unknown speaker model has a higher likelihood for the second person's speech.

In block 1108, based on the training data extracted in block 1106 for the second participant, the training functionality 102 can generate a speaker model for the second participant.

In a third sharing technique, a first user can provide an audio segment to the training functionality 102 that captures his or her voice. The first user can obtain the audio segment from any source, such as from a telephone conversation, from a one-on-one conversation, or from a dedicated training session (e.g., in which the user reads from a script), etc. The training functionality 102 can then generate a model based on the audio segment. The training functionality 102 can then download the speaker model to the first user. Alternatively, the first user's local device (e.g., device A 804 of FIG. 1) can be used to generate the speaker model for the first user.

At this point, the first user can transfer the speaker model to at least one other user, e.g., a second user. The second user may henceforth use the received speaker model to identify the first user, e.g., when conversing with the first user. Alternatively, or in addition, the first user can instruct the training functionality 102 to directly transfer the first user's speaker model to the second user upon its creation or any time thereafter. In a similar fashion, the first user can receive a speaker model from the second user, where the speaker model characterizes the voice of the second user.

Speaker models that originate from different sources may have different respective channel characteristics. To address this issue, the training functionality 102 can use one or more channel normalization techniques in generating the speaker models. For example, the training functionality 102 can use the frequency warping technique in conjunction and delta MFCC coefficients, as described above.

FIG. 12 shows a procedure 1200 which summarizes the above-described behavior. In step 1202, a first user transfers a first user speaker model to a second user. In step 1202', the second user performs the complementary action by transferring a second user speaker model to the first user.

D. Illustrative Applications of the System

FIG. 1300 shows a procedure 1300 that summarizes different application-specific actions that can be performed in response to the identification of a speaker using the technology described above. One or more application modules 1302 may perform these actions.

In block 1304, the system 100 (of FIG. 1) identifies a speaker using any of the techniques described above. In block 1306, an application module performs an application-specific action in response to the conclusion in block 1304.

In one application, an application module can identify and display a name of a particular person in response to detecting speech from that person. For example, assume that the user is speaking with an individual at a meeting or some other in-person forum. The application module can display the name of the individual on a shared display device that is located within the meeting room, or on a personal computing device that is operated by the user (such as a mobile telephone device). Or assume that the user is an elderly user with memory impairment. The application module can assist that user in remembering the names of people by displaying their names when their respective voices have been detected.

In another application, an application module can associate life-logging data with the determined identity of a person. For example, assume that the user is talking with a person in the course of the user's normal daily route. Further assume that the user takes a picture around the same time that this conversation took place. The application module can tag the picture with an indication of the identity of the person. The application module can then store the tagged picture in an archival storage medium. In a related application, the application module can use the technology described herein to monitor and record turn-taking during a meeting, e.g., by registering the contributions of respective users to a meeting.

In another application, an application module can filter social network data based on the determined identity of a person. For example, assume that the user is again talking to a person in the course of his or her daily routine. The application module can retrieve social network data regarding the person, such as that person's social network page(s). Or the application module can filter social network status messages in response to detecting the identity of the person, and so on. For that matter, the application module can retrieve any information regarding the identified person from any source(s). For example, the application module can perform a general Internet search using the name of the identified person as a key term.

In another application, an application module can generate a reminder in response to determining the identity of a person who is speaking. For example, a user may wish to address a certain issue with a certain person when he or she next meets that person. So as not to forget this issue, the user can request the application module to generate a reminder prompt whenever it detects that the person in question is speaking. The application module can display such a prompt on any computing device associated with the user, such as a mobile telephone.

These applications are cited by way of representation, not limitation. Yet other application modules can perform other actions in response to detecting the identity of a speaker.

In closing, the description may have described various concepts in the context of illustrative challenges or problems. This manner of explication does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for identifying a speaker in an energy-efficient manner, comprising:
    at a first processing unit:
        determining whether a received audio signal satisfies an audio strength test; and
        if the audio strength test is satisfied, determining whether the audio signal contains human speech; and
    at a second processing unit:
        identifying whether speech frames, obtained from the audio signal, have a quality which satisfies an admission test, the speech frames which satisfy the admission test comprising admitted frames; and
        associating a speaker model with the admitted frames, the speaker model corresponding to a particular user,
    operations performed by the first processing unit having a first power expenditure and operations performed by the second processing unit having a second power expenditure, the first power expenditure being less than the second power expenditure.

2. The method of claim 1, wherein the operations performed by the first processing unit are performed on a more frequent basis than the operations performed by the second processing unit.

3. The method of claim 1, wherein the first processing unit and the second processing unit are implemented by a portable communication device.

4. The method of claim 1, wherein said determining of whether the audio signal satisfies the audio strength test comprises:
    periodically determining whether the audio signal exceeds a prescribed strength threshold for a predetermined number of audio samples within a prescribed period of time; and
    if the audio signal satisfies the audio strength test, activating a speech detection module to perform said determining of whether the audio signal contains human speech.

5. The method of claim 1, wherein said determining of whether the audio signal contains human speech comprises:
    sampling the audio signal at a prescribed rate and dividing the audio signal into audio frames, a window comprising a plurality of consecutive audio frames;
    determining window features associated with each window;
    determining, using a classifier module, whether the window features indicate that the audio signal contains human speech for each window; and
    if the audio signal contains human speech, activating the second processing unit.

6. The method of claim 1, wherein said identifying of whether the speech frames have a quality which satisfies the admission test comprises:
    determining frame admission metrics for the speech frames;
    identifying, based on the frame admission metrics, the admitted frames; and
    activating a speaker identification module to perform said associating of the speaker model with the admitted frames.

7. The method of claim 1, wherein said associating of the speaker model with the admitted frames comprises:
    receiving the admitted frames;
    generating speaker identification features based on the admitted frames; and determining a speaker model which matches the speaker identification features over a smoothing window, the smoothing window being made up of a plurality of admitted frames.

8. The method of claim 1, wherein said associating of the speaker model with the admitted frames comprises:
identifying a context associated with production of the audio signal; and
selecting the speaker model from a subset of possible speaker models that are associated with the context.

9. The method of claim 1, further comprising:
obtaining, from a local participant, an audio segment that captures a telephone conversation between the local participant and a remote participant;
generating a speaker model for the local participant based on a part of the audio segment that is attributed to the local participant; and
generating a speaker model for the remote participant based on a part of the audio segment that is attributed to the remote participant, wherein said generating of the speaker model for the remote participant employs one or more compensation techniques to address channel distortion in the part of the audio segment that is attributed to the remote participant.

10. The method of claim 9, wherein the part of the audio segment that is attributed to the local participant is associated with a first channel and the part of the audio segment that is attributed to the remote participant is associated with a second channel.

11. The method of claim 1, further comprising:
obtaining, from a first participant, an audio segment that captures a one-on-one conversation between a first participant and a second participant;
identifying a part of the audio segment that is attributed to the first participant and a part of the audio segment that is attributed to the second participant using an audio segmentation algorithm; and
generating a speaker model for the second participant based on the part of the audio segment that is attributed to the second participant.

12. The method of claim 11, wherein the audio segment algorithm comprises using at least a speaker model for the first participant to identify the part of the audio segment that is attributed to the first participant.

13. The method of claim 1, further comprising at least one of:
transferring a speaker model of a first participant to a second participant; and
transferring a speaker model of the second participant to the first participant.

14. The method of claim 1, further comprising performing an action in response to said associating of the speaker model with the admitted frames, the action comprising at least one of:
identifying a name of the particular user when the particular user speaks;
associating life-logging data with the particular user;
filtering social network data based on identification of the particular user; and
generating a reminder that is associated with the particular user.

* * * * *